(12) United States Patent
Lundahl et al.

(10) Patent No.: US 8,231,849 B2
(45) Date of Patent: Jul. 31, 2012

(54) METHOD AND SYSTEM FOR TREATMENT OF MALODOROUS GASES EMANATING FROM A PULP MILL

(75) Inventors: Robert Lundahl, Oskarshamn (SE); Sofia Törnebrink, Ornskoldsvik (SE)

(73) Assignee: Metso Power AB, Gothenburg (SE)

( * ) Notice: Subject to any disclaimer, the term of this patent is extended or adjusted under 35 U.S.C. 154(b) by 33 days.

(21) Appl. No.: 13/057,758

(22) PCT Filed: Aug. 11, 2008

(86) PCT No.: PCT/SE2008/050914
§ 371 (c)(1),
(2), (4) Date: Mar. 4, 2011

(87) PCT Pub. No.: WO2010/019079
PCT Pub. Date: Feb. 18, 2010

(65) Prior Publication Data
US 2011/0142740 A1    Jun. 16, 2011

(51) Int. Cl.
*B01D 53/48*    (2006.01)
*B01D 53/58*    (2006.01)
*B01D 53/74*    (2006.01)

(52) U.S. Cl. .............. 423/210; 423/237; 423/242.1; 422/168

(58) Field of Classification Search .......... 423/210, 423/237, 242.1; 422/168
See application file for complete search history.

(56) References Cited

U.S. PATENT DOCUMENTS
6,592,340 B1 *    7/2003    Horo et al. ............... 417/293
* cited by examiner

*Primary Examiner* — Timothy Vanoy
(74) *Attorney, Agent, or Firm* — Rolf Fasth; Fasth Law Offices

(57) ABSTRACT

The method and system relate to reducing the content of hazardous chemicals when handling malodorous gases emanating from a pulp mill and before burning said malodorous gases in final incineration equipment in oxygen excess environment in order to oxidize the sulphur compounds. The flow of malodorous gases is transported to final incineration ($C_2$) by using liquid ring pumps. The hazardous chemical, preferably ammonia, is bound or dissolved in the liquid used in the liquid ring pump. A part of the liquid used in the liquid ring pump is bled off to final destruction different than the final incineration equipment in oxygen excess environment.

16 Claims, 3 Drawing Sheets

METHOD AND SYSTEM FOR TREATMENT OF MALODOROUS GASES EMANATING FROM A PULP MILL

PRIOR APPLICATION

This application is a U.S. national phase application that claims priority from International Application No. PCT/SE2008/050914, filed 11 Aug. 2008.

TECHNICAL FIELD OF THE INVENTION

The present invention relates to a method and system of reducing the content of hazardous chemicals when handling malodorous gases, such as non-condensable gases containing sulphur compounds, emanating from a pulp mill and before burning said malodorous gases in final incineration equipment in oxygen excess environment in order to oxidise the sulphur compounds.

STATE OF THE ART

At a pulp mill, in a pulp cooking process, organic nitrogen originating from wood is separated in gaseous form, particularly in the form of ammonia, but also as other gaseous nitrogen compounds, during different process steps, such as chip steaming, cooking, evaporation, stripping etc. These malodorous gases contain methanol ($CH_3OH$), ammonia ($NH_3$) and turpentine ($C_{10}H_{16}$) as well as total reduced sulphur (TRS) gases such as hydrogen sulphide ($H_2S$), methyl mercaptan ($CH_4S$), dimethyl sulphide [$(CH_3)_2S$], and dimethyl disulfide [$(CH_3)_2S_2$]. The TRS content is also named as NCG-gases (Non condensable gases).

These malodorous gases are collected in gas collection systems designed for forwarding gases at low volume and high concentration, (LVHC), or alternatively at high volume and low concentration, (HVLC). These gases are finally destructed before release to recipient or atmosphere. LVHC gases, or strong gases, are at such high concentration that they are above the explosive range, while HVLC gases or weak gases are so diluted that they are below the explosive concentration range.

When methanol or turpentine is condensed from these malodorous gases, part of the ammonia is also condensed into liquid form with the methanol or turpentine. When malodorous gases are combusted in a separate malodorous gas boiler, or in other boilers such as a recovery boiler or a power boiler, or in the lime kiln in the causticising process, they are combusted in oxygen excess environment in order to oxidise the sulphur compounds. However, ammonia is oxidized into various nitrogen oxides, increasing nitrogen emissions at said mills. High phasing of air feed to reduce nitrogen oxide emissions easily results in an increase in ammonia and flue sulphur emissions. Similarly, combusting methanol or turpentine in different boilers induces either various nitrogen oxides or ammonia emissions. The most problematic issue is the inability to systematically avoid the formation of detrimental emissions in combustion of methanol and malodorous gases that contain a plurality of different compounds.

Attempts have been made to reduce emissions of nitrogen compounds, i.e. mainly nitrogen oxides, from recovery and power boilers by what is known as stepped combustion, in which air is supplied to a boiler in several successive stages to make combustion take place at mainly under-stoichiometric conditions, i.e. combusted in oxygen deficient environment. This considerably reduces the formation of $NO_X$. In the staged systems is also the formation of thermal $NO_X$ prevented in the second oxygen rich combustion zone by keeping the temperature below 1300° C. A similar system with staged combustion is sold by Metso Power under the name of Dec-$NO_X$™

Attempts have also been made to reduce $NO_X$ contents in flue gases by supplying various reagents to flue gases for preventing the formation of $NO_X$ compounds or for converting them into a form in which they can be removed as easily as possible, Such an additive may be ammonia or urea purchased outside the mill, in which case the $NO_X$ present in the flue gas reacts with ammonia, forming gaseous nitrogen which can be discharged to the atmosphere. It is also possible to use various solid or liquid ammonium salts as the reagent in this so-called SNCR method known per se. The problem with this technique is the high cost of reagents to be purchased outside the mill.

It is also known to supply hydrocarbons, such as natural gas or the like, to flue gases in a boiler, the resulting reduction in $NO_X$ compounds being due to so-called hydrocarbon radicals speeding up the reactions of nitrogen compounds. The drawbacks of such methods are the high investment and operating costs, since the additives are purchased outside the mill, and in addition, equipment is required for storing, batching, adjusting and feeding the additives.

WO 9420676 discloses a method in which oxygenous hydrocarbon, such as methanol obtained in the pulp cooking process, is supplied to flue gases in a recovery boiler. In this method, methanol and any aqueous steam are supplied to the upper part of a recovery boiler to be mixed with flue gases, whereupon the flue gases are washed with white liquor or with an aqueous solution containing ammonia-based and/or alkali-based compounds. The method is based on the nitrogen oxide NO contained in the flue gases becoming partly oxidized and forming nitrogen dioxide $NO_2$, which can be removed by an alkali scrubber. The drawback of this method is that it has an effect only on the reduction in oxides of already formed nitrogen, and the only reagent that can be used is methanol or a corresponding hydrocarbon derivative. In addition, the method requires a dedicated flue gas scrubber suitable for removing $NO_2$, and the treatment of nitrogen compounds remaining in the washing liquid is still problematic.

U.S. Pat. No. 6,030,494 discloses a method, according to which ammonia is removed from malodorous gases prior to burning said gases, which results in a decrease in the nitrogen oxide content of the flue gas generated in the burning. According to said patent, ammonia is preferably removed by washing the gases in a dedicated scrubber in order to bind the ammonia from the gases. The washing liquid may preferably be a bisulphite solution. Another washing liquid from the chemical pulp mill, which solution has a pH in the neutral or acid range, may be used, such as acid bleaching effluent or waste acid from a chlorine dioxide plant.

Also in U.S. Pat. No. 6,517,793 is disclosed a method wherein ammonia is removed from the malodorous gases prior to burning said gases. Here is proposed to use a molecular sieve or a water scrubber in order to separate the ammonia.

In U.S. Pat. No. 5,450,892 is disclosed yet another solution for handling malodorous gases, and where a dedicated alkaline scrubber is used to selectively remove TRS compounds and to allow most of the methanol to remain in the scrubbed gases.

SUMMARY OF THE INVENTION

A primary objective of the invention is to enable a selective and safe extraction of hazardous chemicals in a controlled manner when pumping malodorous gases to final destruction, said malodorous gases containing non-condensable gases, emanating from a pulp mill.

Said gases contains a multitude of hazardous chemicals that each needs individual attention in order to be destructed or taken care of properly. The main objective when handling so called strong gases in pulp mills are the destruction of sulphur compounds that induce a strong and unwanted odour around the pulp mill. For best possible destruction is used equipment where the incineration takes place in oxygen excess environment which could oxidise the sulphur compounds and the mercaptans. However, these conditions are not optimal for incineration of for example ammonia, which often forms $NO_x$ emissions at these conditions.

A second objective is to enable a selective extraction of especially ammonia in gas forwarding pumps used in the gas handlings system. If a liquid ring pump is used then two functions in one piece of equipment could be obtained, and the need for special gas scrubbers could be reduced significantly.

The invention is especially suitable for treatment of low volume, high concentration (LVHC) gases. High volume, low concentration (HVLC) gases may also be treated in accordance with the invention.

These objectives are reached with a method and system according to the characterising part of claim 1 and claim 10 respectively.

LIST OF DRAWINGS

DETAILED DESCRIPTION OF THE INVENTION

The key component in the invention is the use of a conventional liquid ring pump in the malodorous gas handling system. In most gas handling systems of this kind are steam driven ejectors, i.e. thermocompressors, predominantly used. But the ejectors are not suitable for extracting gases such as ammonia from the main flow of malodorous gases. Another disadvantage with the ejector is that the gas volume to be handled increases considerably, which calls for larger piping for handling the gas volume. Yet another disadvantage is that the steam added in the ejector increase risks for condensation in the gas handling system. Operating costs is also higher for an ejector, as well as an inferior control capacity which could cause instable operation with risks for gas emissions.

Figure 1:
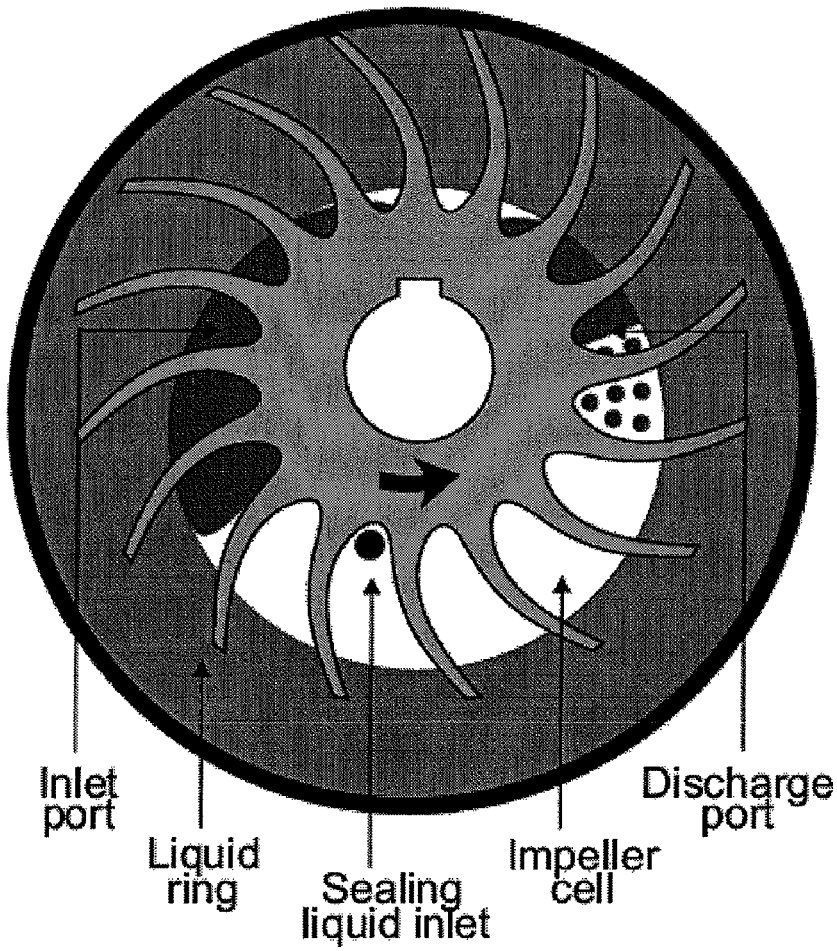
FIG. 1 show the principles of a liquid ring pump.

The conventional liquid ring pump as shown in FIG. 1 compress gases by means of a vaned impeller rotating within and eccentric to a cylindrical casing. Liquid is fed into the pump and by centrifugal action, forms a moving cylindrical liquid ring, indicated by the grey area around the impeller in FIG. 1, against the inside of the casing. This liquid ring creates a series of seals in the space between the impeller vanes to form compression chambers. The eccentricity between the impeller rotating axis and the casing geometric axis results in a cyclic variation of the volume enclosed by the vanes and the ring.

Gas drawn into the pump via an inlet port in the end of the casing, is trapped in the space formed by the impeller vanes and the liquid ring. The impeller rotation compresses the gas, which is then discharged through the discharge port in the end of the casing.

Figure 2:
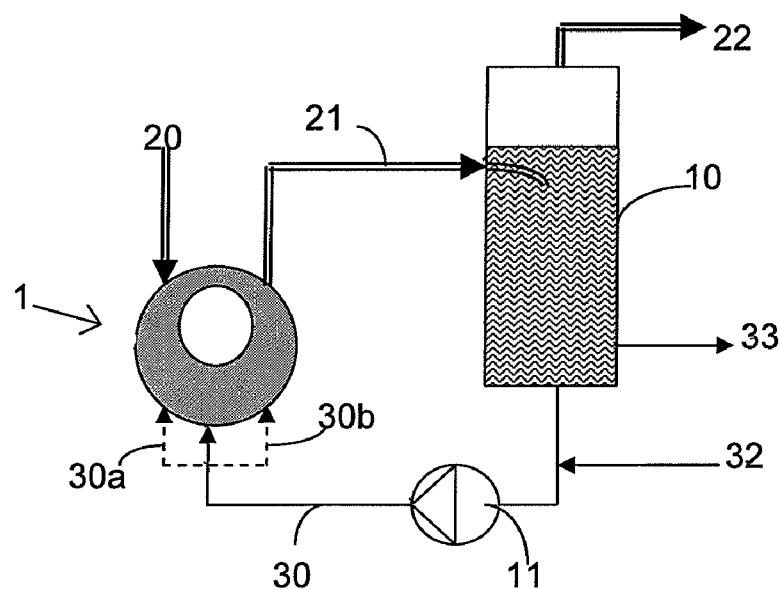
FIG. 2 show the principles of the liquid supply system to a liquid ring pump.

As shown in FIG. 2 are the gases 20 to be forwarded by the pump led to the inlet port of the liquid ring pump. Some ring-liquid is also entrained with the discharged gas stream 21. As shown could this liquid be separated from the gas stream in a separation tank 10 external to the pump. In some systems are the discharged gas stream 21 fed out in the separation tank 10 above the liquid level, but as the system is intended to dissolve a hazardous chemical into the liquid, could instead the outlet be located underneath the liquid level in the separation tank.

In some systems, the discharged ring-liquid is also cooled in order to suppress boiling via heat exchanger or cooling tower (not shown) when returned to the pump casing. The discharged hot liquid 33 is treated as a waste stream 33 and bled off from the liquid system. In this case, fresh, cool liquid 32 is used to make up the loss. However, environmental considerations have made such once through systems increasingly rare. Sealing liquid is pumped with a pump 11 from the separation tank and back to the sealing liquid inlet of the liquid ring pump. In some systems the sealing liquid is supplied via two individual sealing liquid inlets 30*a*, 30*b* located on both sides of the impeller, and complemented by a main supply inlet connected directly to the sealing ring. However, in some systems could the liquid volume in the ring be established entirely from the individual sealing liquid inlets 30*a*, 30*b*. If the total liquid volume flushing trough the liquid ring pump should be increased, besides the liquid volume entrained with the discharged gas stream 21, could an additional draining line be connected between the liquid ring and the separation tank 10.

Liquid ring systems can be single or multi-stage. Typically a multi-stage pump will have up to two compression stages on a common shaft. Liquid Ring Vacuum Pumps can use any liquid compatible with the process, provided it has the appropriate vapor pressure properties, as the sealant liquid. Although the most common sealant is water, almost any liquid can be used.

Figure 3:
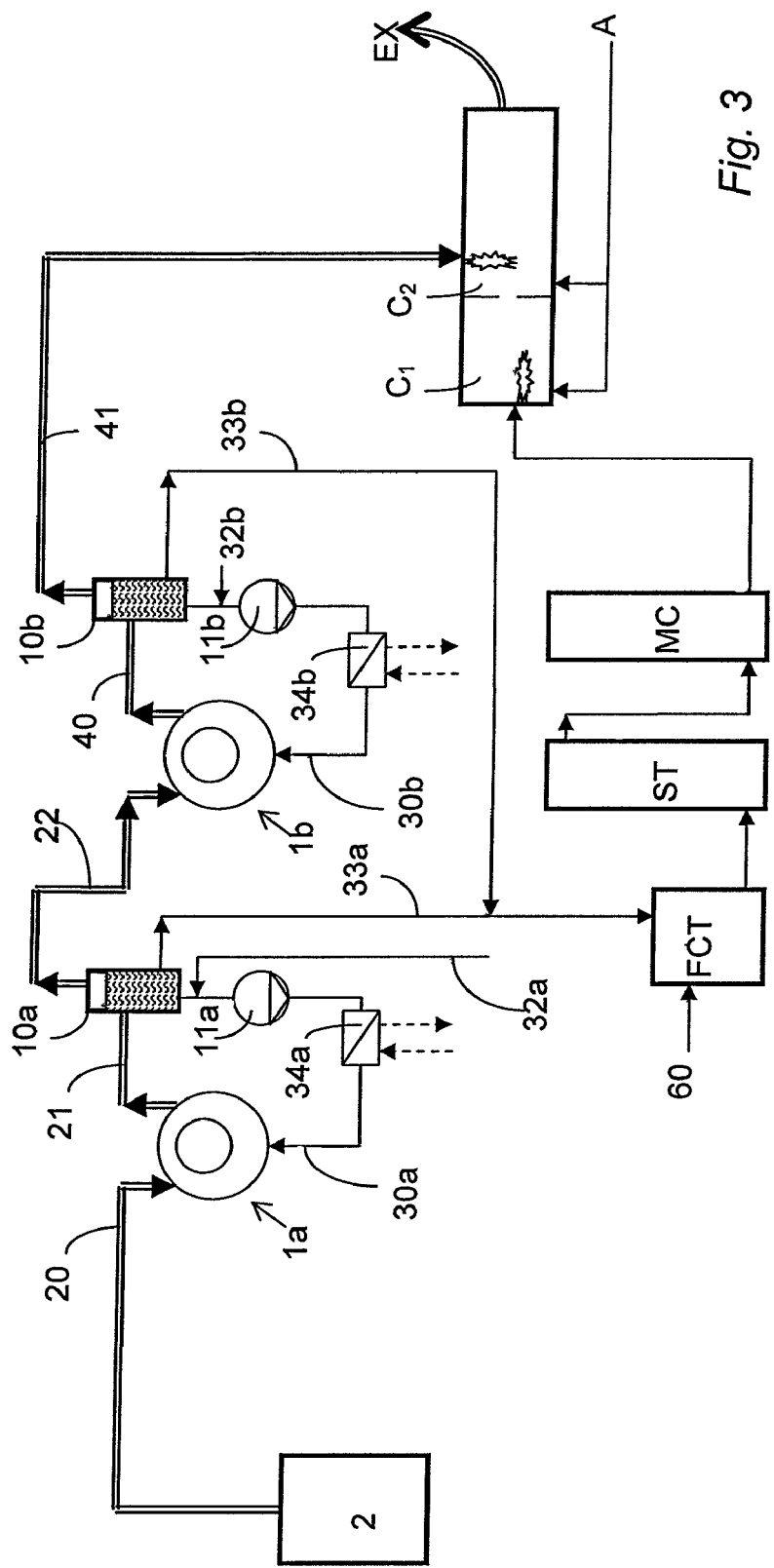
FIG. 3 show the principles of the inventive gas collecting system for malodorous gases, and FIG. 4 show the principles of an alternative inventive gas collecting system for malodorous gases

In FIG. 3 is shown an inventive system for reducing the content of hazardous chemicals when handling malodorous gases, such as non-condensable gases containing sulphur compounds, emanating from a pulp mill. The system will reduce the ammonia content in the bulk volume of the malodorous gases in the gas flow before burning said malodorous gases in a final incineration equipment in oxygen excess environment in order to oxidise the sulphur compounds.

The flow of malodorous gases are transported from the point of generation in the pulp mill 2, which point of generation could correspond to either of following examples;

The cooking stage, for example flash steam from flash tanks;

The evaporation stages, for example gases from foul condensate treatment;

The Venting system in dissolving tank for the melt from the recovery boiler,

The Methanol separation system

The malodorous gases 20 are conducted to final incineration in a gas conducting pipe system in a flow 20-21-22-40-41 and where the flow of gas is promoted by using at least one liquid ring pump 1*a*/1*b*. The liquid ring pump having a liquid supply system comprising a liquid tank 10*a*/10*b* and liquid supply means 11/30*a* from the liquid tank to the liquid ring pump and liquid collection means from the liquid ring pump to the liquid tank. The liquid supply and liquid collection means develop a flow of liquid trough the liquid ring pump.

The hazardous chemical is bound or dissolved in the liquid flowing trough the liquid ring pump. A part of the liquid used in the liquid supply system is bled off from the liquid tank via an outlet $33a/33b$ and the methanol content thereof is sent to final destruction $C_1$ in oxygen deficient environment different than said final incineration equipment $C_2$ in oxygen excess environment.

In FIG. 3 is the final destruction of methanol conducted in the first zone in a staged combustion where the destruction takes place in oxygen deficient environment, and the final incineration equipment $C_2$ is the second stage in the staged combustion where the incineration takes place in oxygen excess environment. The remaining flue gases are exhausted into the ordinary exhaust EX.

This staged combustion is controlled by supplying a part of the combustion air A to the first zone such that under-stoichiometric conditions are established, and adding more air to the second zone such that over-stoichiometric conditions are established in this second zone.

However, final destruction and the final incineration equipment could also be implemented in physically separated equipment, for example a stand alone incinerator and using an existing boiler or lime kiln of the mill respectively. As a part of the liquid is bled off is the liquid tank $10/10a/10b$ connected to a fresh liquid supply $32/32a/32b$ in order to maintain the liquid volume in the liquid ring pump system.

As the malodorous gases contains ammonia is a part of the liquid bled off via an outlet $33a/33b$ to final destruction. This final destruction is preferably integrated with the system for handling foul condensate 60 from the evaporation stages. The liquid bled out could then be sent to an inlet of a stripper ST, preferably via the ordinary foul condensate tank FCT. The stripper gases emanating from the stripper outlet are thereafter sent to an inlet of a methanol column MC, such that the accumulated ammonia from the bled off part of the liquid from the liquid ring pump ends up in the liquid methanol obtained from the methanol column outlet.

The liquid methanol is thereafter led from the methanol column outlet to a first combustion stage $C_1$, where the methanol is combusted in oxygen deficient environment.

Type of Liquid in Liquid Ring Pump

If the primary objective is to reduce ammonia content in the malodorous gases should the liquid used in the liquid ring pump correspond to a liquid wherein ammonia has a high order of solubility. If using water as the liquid in the liquid ring pump, then ammonia could be dissolved in the liquid in large volume. As much as 48 g of ammonia could be dissolved per 100 g of water (approx 32% by weight). In commercial grades of Ammonium Hydroxide is the concentration of ammonia as high as 19-30% by weight at a temperature of 15° C. The liquid used in the liquid ring pump is a liquid where the solubility of ammonia exceeds 20 g per 100 g of liquid.

The bled out volume per time unit could be determined empirically as a fix volume per time unit or per volume unit of gas flow forwarded, or the system could have some feed back control of the dissolved amount of ammonia.

Ph-Control of Bleed Out Volume

One simple feed back control system could use pH-sensors, as the pH level is dominantly affected by the actual concentration of ammonia. In an ammonium hydroxide solution is pH related to concentration as follows;

| pH | 11.7 | 12 | 12.4 | 13.5 |
|---|---|---|---|---|
| Conc. | 1% | 5% | 10% | 30% |

When the dissolving rate of ammonia in the liquid decreases should liquid be bled off from the liquid system. As it is difficult to dissolve ammonia to higher concentration than 30% in water, and dissolving rate decreases near this maximum order of solubility, could an optimal threshold for bled-out control be set to about 15-20%.

Conditioning of Liquid

In order to increase the solubility of ammonia in water it is important that the water is relatively cool. The solubility of ammonia in water decreases with increasing temperature, according to;

| Temperature (° C.) | 0 | 40 | 80 | 100 |
|---|---|---|---|---|
| $NH_3$ in solution (wt %) | 45 | 22 | <10 | <5 |

In order to reduce the temperature is preferably at least one cooler or heat exchanger $34a/34b$ installed in the liquid circulation as shown in FIG. 3. The control of the cooler $34a/34b$ is preferably made such that the temperature of the circulated liquid in the liquid-ring circulation system is kept below 40° C., preferably below 30° C. and most preferably below 20° C. The make up liquid supplied via $32a/32b$ is also preferably as cool as possible, which lowers the cooling effect needed in the cooler $34a/34b$ proportionally to temperature of the make up liquid. In some systems could the cooling effect be obtained solely from the addition of cool make up liquid.

Option with Multiple Bleed Out Systems

As indicated in FIG. 3 could the flow of malodorous gases be transported to final incineration equipment in a gas conducting pipe system by using several liquid ring pumps $1a/1b$ arranged in series in said gas conducting pipe system. In such a system could different hazardous chemicals from the malodorous gases be made to dissolve into the liquid used in each individual liquid ring pump. Each liquid ring pump $1a$, $1b$ could thus have a dedicated liquid supply system $10a/30a/32a$ and a selected liquid adapted for the specific hazardous chemical to be extracted, and where a part of the liquid used in each liquid supply system is bled off to final destruction equipment. As shown in FIG. 3 could this second flow $33b$ contain another chemical than ammonia, and the liquid $32b$ used in the liquid ring pump could be bisulphite in liquid form or any other chemical that reacts with one of the hazardous chemicals in the malodorous gases.

Potential Reduction of Number of Liquid Locks Installed

The invention could be modified in numerous ways within the scope of the claims. It is to be noted that the separation tanks $10/10a/10b$ used for the liquid ring pumps are perfect liquid-locks in the gas forwarding system, preventing flame propagation backwards in the system from the incineration.

Normally the risk for flame propagation backwards is reduced by keeping flow rate in the gas system above the flame propagation speed, but this control option alone does not work when gas flows occasionally decreases below flame propagation speed. Due to this problem is often several liquid-locks installed in the gas forwarding system. A number of these liquid locks could be avoided by using the liquid ring pump system according to the invention.

Combination of Liquid Ring Pump and Preceding Liquid Locks

Figure 4:
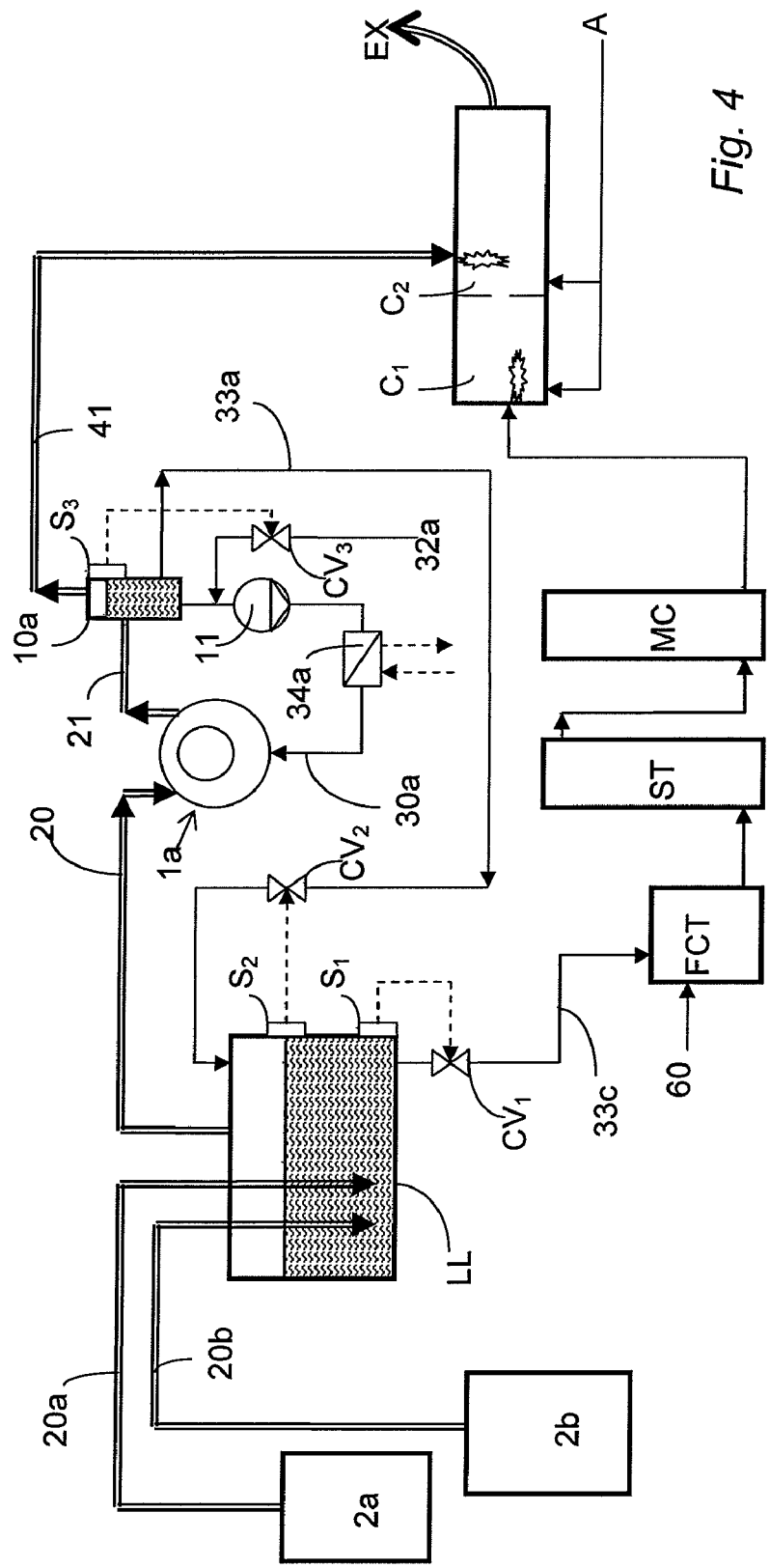

However, a combination of a first liquid lock and a subsequent liquid ring pump could be used as shown in FIG. 4. In FIG. 4 are those components similar to the system shown in FIG. 3 marked with same reference numbers and not described again. The system shown in FIG. 4 differs from the system shown in FIG. 3 in that only one liquid ring pump system is used, and that a liquid lock LL precedes the liquid ring pump system. In FIG. 4 is also shown an embodiment of a control system with control valves $CV_1$, $CV_2$, $CV_3$ and sensors $S_1$, $S_2$, $S_3$. The liquid lock provides multiple functions as of collecting gases from different sources 2a, 2b, preventing gases from different sources to flow backwards into other sources as well as preventing flame propagation backwards.

As to the control of the system is also shown a first control valve $CV_1$ that is controlled preferably by a pH-sensor $S_1$. When the pH of the liquid in the liquid lock LL is above the set threshold is the valve opened and dumps liquid to the ordinary foul condensate tank FCT.

The liquid level in the liquid lock LL is monitored by any suitable level sensor $S_2$ that controls the valve $CV_2$ in line 33a. When the level drops below a set threshold value is the valve opened and the correct liquid level is established again.

The liquid level in the separation tank 10a is monitored by any suitable level sensor $S_3$ that controls the valve $CV_3$ in line 32a. When the level drops below a set threshold value is the valve opened and the correct liquid level is established again.

The function of the system is that the main part of the ammonia content of the malodorous gases are dissolved in the liquid lock LL, and ammonia rich liquid 33c is bled out via valve $CV_1$ when the pH indicate a high level of dissolved ammonia. The remaining malodorous gases then passes the liquid ring pump system and any residual amount of ammonia is dissolved in the liquid used in the liquid ring pump system. The flow of the liquid goes counter current to the flow of the malodorous gases, as fresh and cool liquid 32a is added via valve $CV_3$, and subsequently bled out via line 33a to the liquid lock LL, and finally is bled out via line 33c to the foul condensate tank FCT, and handled similarly as done in the system shown in FIG. 3. The additional liquid ring pump system, besides the liquid lock, could lower the $NO_x$ content further in final incineration as much as some 10-30 ppm.

With this control system the malodorous gases emanating from at least one location 2a, 2b in the pulp mill are first collected in and passes the liquid lock LL before being forwarded by the first liquid ring pump 1a, and the liquid 33a bled out from the first liquid ring pump system via a control system $CV_2$, $S_2$ is sent counter current to gas flow to the liquid lock and liquid 33c bled out from the liquid lock via a control system $CV_1$, $S_1$ is sent to final destruction. As the major part of ammonia will dissolve in the liquid lock, a larger flow of saturated liquids are bled off from the liquid lock, and new fresh and unsaturated liquid is replenished into the liquid ring pump system, maintaining a high order of solubility of any residual ammonia in the liquid ring pump system.

Other type of control systems could be used instead of this simple type of control system.

Potential in Increasing Solubility in Liquid in Liquid Ring Pump

The liquid supply system of the liquid ring pumps could also be improved in several ways in order to increase the solubility of the chemical to be bound or dissolved into the liquid. Make up water to the liquid ring in the pump could for example be injected directly into the impeller cell by mist forming nozzles.

Potential in Increasing Solubility in Liquid in Separation Tank

The design of the separation tank 10a/10b could also be improved in order to increase the dissolving effect of the chemical at the expense of decreased separation. In order to improve dissolving of these chemicals into the liquid could the outlet be configured as a diffusing member located in the near bottom of the separation tank 10a/10b. The interior of the separation tank could also be filled with small filling bodies that establish a packed bed, i.e. random packing, that increase contact time between gas flow and the liquid in the separation tank. The inlet of the pressurised gas into the separation tank could thus be arranged in a low level liquid bath arranged above the liquid level in the separation tank, similarly to what is shown in the separator in U.S. Pat. No. 6,004,364.

The invention could be modified in a number of ways within the scope of following claims. The basic concept is to use the liquid ring pump system to dissolve hazardous chemicals in the liquid used in the liquid ring pump, and bleed out liquid close to its maximum saturation level, i.e. before reaching its maximum saturation level, in a controlled manner so that the hazardous chemicals could be dissolved in the liquid continuously during operation of the liquid ring pump.

While the present invention has been described in accordance with preferred compositions and embodiments, it is to be understood that certain substitutions and alterations may be made thereto without departing from the spirit and scope of the following claims.

The invention claimed is:

1. A method of reducing a content of hazardous chemicals when handling malodorous gases emanating from a pulp mill and before burning the malodorous gases in a final incineration equipment ($C_2$) having an oxygen excessive environment in order to oxidize sulphur compounds, comprising:
   transporting a flow of malodorous gases to a final incineration by using liquid ring pumps
   binding a hazardous chemical in a liquid used in the liquid ring pump, and
   bleeding off a part of the liquid used in the liquid ring pump to a final destruction ($C_1$) being different from a final incineration equipment having an oxygen excessive environment.

2. A method according to claim 1 wherein the method further comprises the malodorous gases containing at least ammonia, and the part of the liquid bled off to final destruction is first passed to a stripper, and stripper gases are thereafter sent to a methanol column such that accumulated ammonia from the bled off part of the liquid from the liquid ring pump ends up in a liquid methanol.

3. A method according to claim 2 wherein the method further comprises combusting the liquid methanol in an oxygen deficient environment.

4. A method according to claim 3 wherein the method further comprises using the liquid in the liquid ring pump containing ammonia that has a high order of solubility.

5. A method according to claim 4 wherein the method further comprises using the liquid in the liquid ring pump wherein the solubility of the ammonia exceeds 20 g per 100 g of liquid.

6. A method according to claim 5 wherein the method further comprises cooling the liquid used in the liquid ring pump in a cooler in order to increase the solubility such that a temperature of the liquid is kept below 40° C.

7. A method according to claim 6 wherein the method further comprises adding an acidifier to the liquid used in the liquid ring pump in order to increase the solubility.

8. A method according to claim 1 wherein the method further comprises transporting the flow of malodorous gases to the final incineration by using several liquid ring pumps in series, and wherein different hazardous chemicals from the malodorous gases are bound in liquid used in each individual liquid ring pump and wherein a part of the liquid used in each liquid ring pump is bled off to the final destruction.

9. A method according to claim 1 wherein the method further comprises first collecting the malodorous gases emanating from at least one location in the pulp mill and passing a liquid lock before being forwarded by a first liquid ring pump, and liquid bled out from the first liquid ring pump system is sent counter current to gas flow to the liquid lock and wherein liquid bled out from the liquid lock is sent to the final destruction.

10. A system for reducing a content of hazardous chemicals when handling malodorous gases emanating from a pulp mill and before burning the malodorous gases in a final incineration equipment ($C_2$) in an oxygen excessive environment in order to oxidize sulphur compounds, comprising:

means for transporting a flow of malodorous gases from a point of generation in the pulp mill to a final incineration ($C_2$) in a gas conducting pipe system, means for promoting the flow of malodorous gas by using at least one liquid ring pump, the liquid ring pump having a liquid supply system comprising a liquid tank and liquid supply means for supplying a liquid from a liquid tank to the liquid ring pump, liquid collection means for collecting liquid from the liquid ring pump into the liquid tank, the liquid supply means and the liquid collection means being adapted to develop a flow of liquid through the liquid ring pump, and the hazardous chemical being bound in the liquid flowing through the liquid ring pump, means for bleeding off a part of the liquid used in the liquid supply system from the liquid tank via an outlet to a final destruction ($C_1$) different than the final incineration equipment having the oxygen excessive environment, and the liquid supply system being connected to a fresh liquid supply in order to maintain a liquid volume in the liquid ring pump.

11. A system according to claim 10 wherein the malodorous gases contains at least ammonia and the bled off liquid is in fluid communication with a stripper (ST) containing stripper gases and having a stripper outlet defined therein, a methanol column (MC) has an inlet defined therein, the stripper outlet being in fluid communication with the inlet of the methanol column (MC).

12. A system according to claim 11 wherein the final destruction ($C_1$) is a burner having an oxygen deficient environment.

13. A system according to claim 11 wherein the ammonia has a high order of solubility.

14. A system according to claim 13 wherein the solubility of the ammonia exceeds 20 g per 100 g of liquid.

15. A system according to claim 10 wherein the flow of malodorous gases are transported to a final incineration equipment ($C_2$) in a gas conducting pipe system by using several liquid ring pumps arranged in series in the gas conducting pipe system, each liquid ring pump has a dedicated liquid supply system and a selected liquid adapted for a specific hazardous chemical to be extracted.

16. A system according to claim 10 wherein the system has a liquid lock (LL) preceding the liquid ring pump and the liquid bled out from the liquid system is in fluid communication with a control system ($CV_2$, $S_2$).

* * * * *